United States Patent [19]

Edelmann

[11] 4,401,620

[45] Aug. 30, 1983

[54] METHOD AND CIRCUIT ARRANGEMENT FOR DETERMINING THE INDIVIDUAL COOLANT FLOW RATE OF THE FUEL ELEMENTS OF A NUCLEAR REACTOR

[75] Inventor: Martin Edelmann, Ettlingen, Fed. Rep. of Germany

[73] Assignee: Kernforschungszentrum Karlsruhe GmbH, Karlsruhe, Fed. Rep. of Germany

[21] Appl. No.: 240,066

[22] Filed: Mar. 3, 1981

[30] Foreign Application Priority Data

Mar. 4, 1980 [DE] Fed. Rep. of Germany ....... 3008198

[51] Int. Cl.³ .................................................. G21C 17/00
[52] U.S. Cl. .................................... 376/247; 376/254; 376/216; 364/527
[58] Field of Search ............... 376/215, 216, 217, 210, 376/246, 254, 247, 450; 364/504

[56] References Cited

U.S. PATENT DOCUMENTS 3,752,735  8/1973  Musick ................................ 376/216
4,319,959  3/1982  Monta ................................. 376/216

OTHER PUBLICATIONS

Benkert, J. et al., Progress in Nuclear Energy, vol. 1, pp. 553-563, Pergamon Press, 1977.
Waln, D., Atomwirtschaft (Atomic Energy Economics), Dec. 1973, pp. 580-582.

Primary Examiner—Donald P. Walsh
Attorney, Agent, or Firm—Spencer & Kaye

[57] ABSTRACT

A method for determining the transit time and flowrate of coolant traversing a cooling channel of a nuclear reactor fuel element from the effective center of the fuel element to a point where the cooland exits therefrom.

13 Claims, 4 Drawing Figures

METHOD AND CIRCUIT ARRANGEMENT FOR DETERMINING THE INDIVIDUAL COOLANT FLOW RATE OF THE FUEL ELEMENTS OF A NUCLEAR REACTOR

BACKGROUND OF THE INVENTION

The present invention relates to a method for measuring the coolant flow rate of a fuel element and to apparatus for practicing the method.

In water or liquid metal cooled reactors, each fuel element comprises a plurality of metal clad fuel rods which are arranged in a common wrapper tube in such a manner that a cooling channel is formed which has a cross section that is sufficient for removing the thermal energy. The operational safety of the reactor and the optimum performance of each fuel element is critically dependent on the mass flow rae with which the coolant flows through its cooling channel with respect to the power produced in the fuel element. Thus, it is necessary to continuously measure the coolant flow rate and the power of each fuel element, and to perform these measurements redundtantly so as to exclude erroneous operations.

Although flow meters for measuring the rate of flow of liquid metals are known, their installation is generally limited to locations in the main coolant lines. This limitation is due to their complicated design, tendency to malfunction, relatively large space requirement and limited service life.

It is also known to monitor the coolant flow rate of reactors indirectly by continuously measuring the coolant exit temperature at the fuel element outlet. However, the coolant exit temperature depends not only on the coolant flow rate but also on the fuel element power which is influenced by the operating conditions and the duration of operation.

It is further known from the publication Atomwirtschaft (Atomic Energy Economics), December 1973, pages 580–582 that the velocity of vapor bubbles developing in the coolant of boiling water reactors may be determined by correlation methods. This technique requires a plurality of neutron detectors which are arranged within the fuel element one on top of the other when seen in the direction of flow. The actual coolant velocity, however, is less than the velocity measured by this method due to slippage of the vapor bubbles, and the method can be used only with the two-phase streams found in boiling water reactors.

In another prior art measuring method of this type, which is discussed in the book, Progress in Nuclear Energy, Volume 1, pp. 553–563, Pergamon Press 1977, Vol. 1, two thermocouples spaced at a distance of about 10 cm are positioned in a closed flow channel in the direction of coolant flow.

It is an object of the present invention to provide a method and apparatus which make it possible, without additional incore instruments and without using flow meters, to continuously measure the coolant flow rate of every fuel element and to detect cooling malfunctions at the time they develop. This permits malfunctions to be immediately corrected thereby preventing seriou damage to the reactor.

SUMMARY OF THE INVENTION

In accordance with the present invention, a method is provided for determining the transit time and flow rate of coolant traversing a cooling channel of a nuclear reactor fuel element from the effective center of the fuel element to a point where the coolant exits therefrom. The method comprises the steps of continuously measuring the temperature of the coolant exiting the fuel element, continuously measuring the temperature of the coolant before it enters the fuel element, generating a measured temperature rise signal corresponding to the difference between the coolant outlet temperature and the coolant inlet temperature; continuously measuring the neutron flux of the core of the reactor by means of at least one neutron detector to generate a neutron flux signal, converting the neutron flux signal to a simulation signal representing a temperature rise in the undelayed simulated coolant outlet temperature, corresponding to the temperature rise of the measured temperature signal, comparing the measured temperature rise with the simulated rise in the undelayed simulated coolant temperature, and determining the time shift of the measured coolant temperature rise with respect to the undelayed simulated coolant temperature rise. The time shift determined in this way corresponds to the transit time of the coolant between the effective center of the fuel element and the point where the coolant exits from the fuel element.

The invention further comprises apparatus for carrying out this method which includes a fuel element simulator which receives the neutron flux signal and converts it to a signal corresponding to the rise in the simulated coolant temperature. This apparatus also includes a first correlator for forming a crosscorrelation function from the ac component (noise) of the measured temperature of the coolant exiting the fuel element and the ac component of the simulated coolant temperature, and a second correlator for forming an autocorrelation function from the ac component of the simulated coolant temperature. The time shift between the cross and autocorrelation functions corresponds to the transit time. The method comprises the steps of continuously measuring the temperature of the coolant exiting the fuel element ("outlet temperature"), continuously measuring, the temperature of the coolant before it enters the fuel element ("inlet temperature"), generating a measured temperature rise signal corresponding to the difference between the coolant outlet temperature and the coolant inlet temperature; continuously measuring the neutron flux of the core of the reactor by means of at least one neutron detector to generate a neutron flux signal, converting the neutron flux signal to a simulation signal simulating an undelayed (promt) signal of the temperature rise of the coolant, when traversing the fuel element, comparing the measured temperature rise with the simulated one, and determining the time shift of the measured coolant temperature rise with respect to the undelayed simulated coolant temperature rise. The time shift determined in this way corresponds to the transit time of the coolant between the effective center of the fuel element and the point where the coolant outlet temperature is measured (top of fuel element).

The invention further comprises apparatus for carrying out this method which includes a fuel element simulator which receives the neutron flux signal and converts it to a signal corresponding to a simulated coolant temperature rise. This apparatus also includes a first correlator for forming a crosscorrelation function from stochastic fluctuations (noise) in the measured temperature of the coolant exiting the fuel element and fluctuations in the simulated coolant outlet temperature, and a second correlator for forming an autocorrelation function from the noise in the simulated coolant temperature rise. The time shift between the cross and autocorrelation functions corresponds to the transit time.

There are several advantages realized with the present invention. First, by using only a power proportional signal and a temperature signal, the transit time of the coolant in the coolant channel of the fuel element can be measured thereby obtaining a flow measurement without the use of a flow meter. Second, in fast reactors, all measuring signals are obtained by the use of the normally available operating instruments, additional incore instruments not being required. Third, falsification of the measured values which occur in conventional indirect flow rate measurements via temperature rise measurements because of changes in the fuel element power are eliminated.

DESCRIPTION OF THE PREFERRED EMBODIMENT

Figure 1:
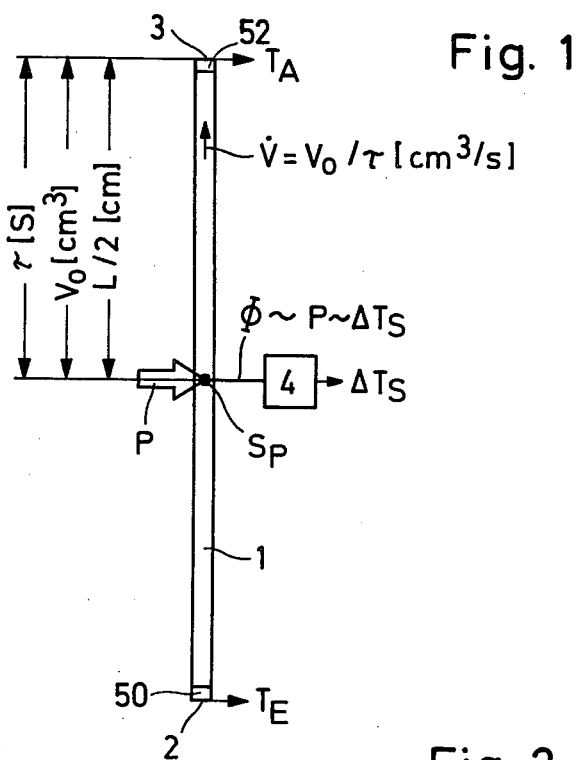
FIG. 1 is a schematic diagram of a fuel element showing measuring points and measured values.

In FIG. 1, a fuel element 1 having a length L and at least one time constant $\tau_{BE}$ is shown in simplified form. The coolant inlet temperature $T_E$ is measured by a thermocouple 50 at (or upstream) the lower end 2 of the fuel element and the coolant outlet temperature $T_A$ by a thermocouple 52 having a time constant $\tau_{TH}$ at its upper end 3. When a plurality of fuel elements are grouped together, the coolant inlet temperature $T_E$ may be measured continuously at least once for all of the fuel elements in the group, once for each sub-group of fuel elements, or it may be measured for each fuel element individually. The coolant outlet temperature $T_A$ is measured continuously at least once at each fuel element exit.

In accordance with a permissible simplification, the power P of the fuel element 1 is considered to be concentrated at the locus of the center of power $S_p$, power center $S_p$ being the effective center of the fuel element which is a distance L/2 from the upper end 3. The power P of fuel element 1 is proportional to the neutron flux $\Phi$ and is measured by at least one neutron flux detector whose position need not coincide with the position of the fuel element. The coolant outlet temperature $T_A$ is changed by fluctuations in the reactor power P (particularly power noise), changes in the reactor power or in the neutron flux, and changes in the coolant inlet temperature.

The neutron flux signal is converted by a fuel element simulator 4 into an equivalent increase $\Delta T_S$ in the undelayed simulator coolant outlet temperature $T_S$ corresponding to the temperature rise of the coolant when passing the fuel element according to the equ. $T_s = T_E + \Delta T_s$.

The coolant requires a transit time $\tau$ to travel from the center of power $S_P$ to the point where the coolant outlet temperature $T_A$ is measured, a path having a length L/2. The volume $V_o$ of the cooling channel between the center of power $S_P$ and the point at the upper end 3 of the fuel element 1 where the coolant exit temperature $T_A$ is measured is constant. Thus, the coolant flow rate V in cubic centimeters per second is the quotient of the volume $V_o$ of the cooling channel in cubic centimeters and the transit time $\tau$ in seconds of the coolant through a cooling channel of length L/2; that is, $$V = V_o/\tau$$

The transit time $\tau$ can be measured by comparing the correlated alternating (ac) components of $\Delta T_A = T_A - T_E$ and $\Delta T_S$ i.e. the temperature rise of the measured and simulated coolant outlet temperatures $T_A$ and $T_S$.

Figure 2:
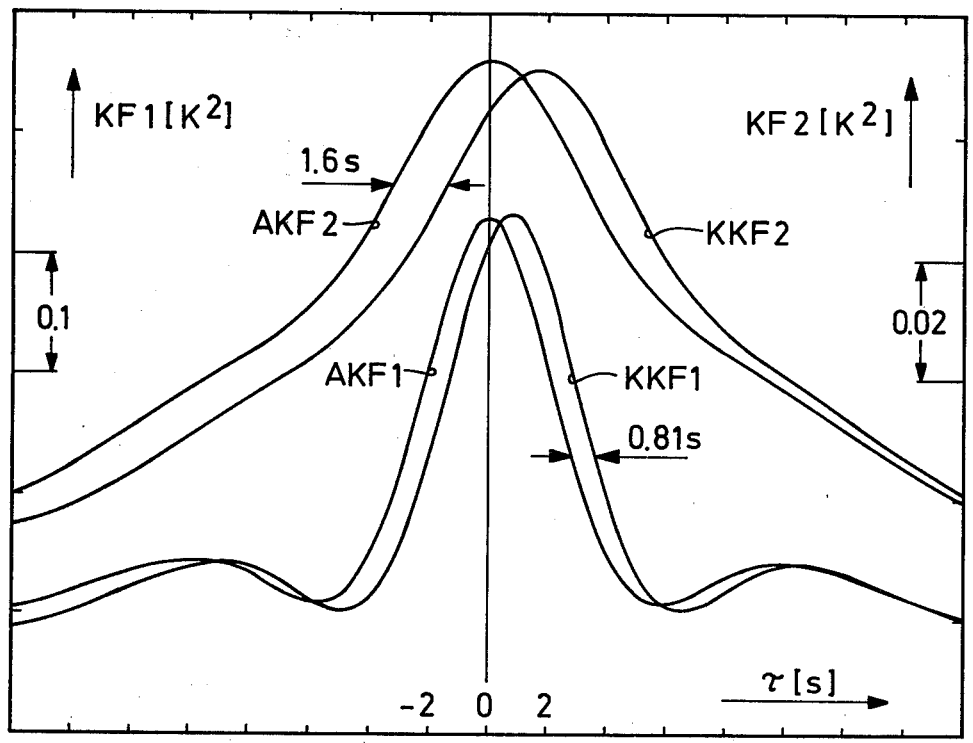
FIG. 2 is a graph of correlation functions vs delay time.

FIG. 2 shows the correlation functions of two different types of fuel elements used in a sodium cooled reactor. The lower pair of curves depicts, for a first type of fuel element, a first autocorrelation function AKF 1 formed from the alternating voltage component of the simulated coolant outlet temperature $T_S$. It also shows a first crosscorrelation function KKF 1 of the alternating voltage component of the simulated coolant outlet temperature $T_S$ and the measured coolant outlet temperature $T_A$. The ordinate scale for the correlation function KF 1 for the first type of fuel element is given in the left-hand margin in units of $K^2$ (K = deg. Kelvin).

The autocorrelation function AKF 1 and the crosscorrelation function KKF 1 are displaced with respect to each other by $\tau_1 = 0.81$ second in a direction parallel to the abscissa. This shift in time can be determined with great accuracy at parallel sections of the ascending and descending edges immediately adjacent the maxima.

The upper pair of the curves shows for a second type of fuel element an autocorrelation function AKF 2 and a crosscorrelation function KKF 2. The ordinate scale for the correlation functions KF 2 is shown for the second type of fuel element in the right-hand margin and the time shift is $\tau_2 = 1.6$ seconds.

There is a phase shift $\phi(\omega)$ between the neutron flux signal and the output of thermocouple 52 corresponding to the delayed coolant outlet temperature $T_A$. This phase shift includes a first component $\phi(\omega)_{BE}$ = arctan $(-\omega\tau_{BE})$ caused by the fuel element 1, a second component $\phi(\omega)_v = -\omega\tau$ caused by the transit time $\tau$ of the coolant and a third component $\phi(\omega)_{TH}$ = arctan $(-\omega\tau_{TH})$ caused by the thermocouple 52 used for measuring the coolant outlet temperature $T_A$, where $\omega$ is the angular frequency of the signal.*

* The transit time $\tau$ can be obtained from the linear part $\phi_v(\omega)$ of the phase angle $\phi(\omega)$ as well as from the displacement of the cross-correlation function.

Figure 3:
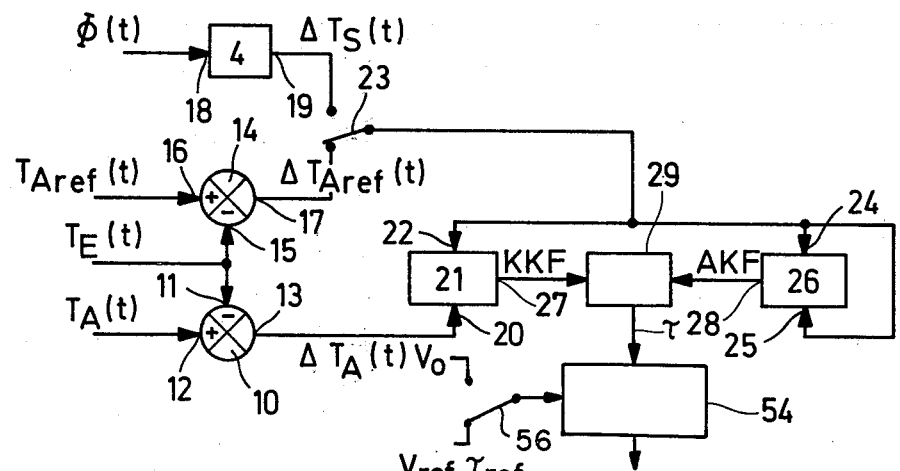
FIG. 3 is a block diagram illustrating apparatus for measuring the transit time of coolant within a fuel element.

A block diagram of a circuit arrangement for measuring the transit time $\tau$ is shown in FIG. 3. A signal $T_E(t)$ corresponding to the coolant inlet temperature $T_E$ is coupled to a first input 11 of a comparator 10 and a signal $T_A(t)$ corresponding to the coolant outlet temperature $T_A$ is fed to comparator 10 at a second input 12. The signal $\Delta T_A(t) = T_A(t) - T_E(t)$ corresponding to the coolant temperature rise is generated at an output 13 of comparator 10.

In a second comparator 14, a signal $T_E(t)$ corresponding to the coolant inlet temperature is introduced at a first input 15 and a signal $T_{Aref}(t)$ corresponding to the coolant outlet temperature $T_{Aref}$ of a reference fuel element is coupled to a second input 16. A signal $\Delta T_{Aref}(t) = T_{Aref}(t) - T_E(t)$ corresponding to the temperature rise of the reference fuel element is generated at an output 17 of comparator 14.

A neutron flux signal $\Phi(t)$ is fed to the fuel element simulator 4 via an input 18, and a simulation signal $\Delta T_S(t)$ which corresponds to the rise of the undelayed simulated coolant outlet temperature $T_S$ generated at output 19.

Output 13 of the first comparator 10 is connected with a first input 20 of a first correlator 21. A second input 22 of the first correlator 21 is coupled, through a switch 23, to either the output 17 of the second comparator 14 or the output 19 of the fuel element simulator 4. Depending on the position of switch 23, correlator 21 forms the crosscorrelation function KKF of either (1) the measured coolant temperature rise $\Delta T_A$ and the undelayed simulated coolant temperature rise $\Delta T_S$, or (2) the coolant temperature rise $\Delta T_A$ and the coolant temperature rise $\Delta T_{Aref}$ of the reference fuel element.

A second correlator 26 has first and second inputs 24 and 25 coupled to switch 23. Depending on the position of switch 23, correlator 26 forms the autocorrelation function AKF of either the undelayed simulated coolant temperature rise $\Delta T_S$ or of the measured coolant temperature rise $\Delta T_{Aref}$ of the reference fuel element.

The crosscorrelation function KKF is generated at the output 27 of correlator 21 and the autocorrelation function AKF is generated at the output 28 of correlator 26. Both outputs 27 and 28 are connected with a comparator 29 which compares the time position of the two correlation functions KKF and AKF and determines the transit time $\tau$.

The correlation functions AKF and KKF are generally defined as the average square module of two stochastic functions (noise signals) as a function of a variable delay time $\tau$ (shift) between the two stochastic functions. The auto or cross correlation functions are obtained for identical or different stochastic functions, respectively.

The correlators 21 and 26 are commercially avaible devices which perform the necessary shift and multiply operations and form the average of the obtained square modules for a certain number of delay time intervalls (as for instance model 3721 manufactured by Hewlett Peckard company). It is also possible to calculate the correlation functions in a general purpose mini- or micro computer (Hewlett Packard model 2100, for instance).

The output of comparator 29 is coupled to a dividing circuit 54 which divides a constant input coupled through a switch 56 synchronized with switch 23 by the output $\tau$ of comparator 29. When switches 23 and 56 are in the positions shown the output V, corresponding to the flow rate of the cooling channel of the fuel element being measured, is equal to $V_{ref}\tau_{ref}/\tau$, where $V_{ref}$ is the known flow rate of the reference fuel element and $\tau_{ref}$ is the known transit time for the reference fuel element. When switch 23 and 56 are switched to their other positions, the output V is equal to $V_0/\tau$. Thus, two methods may be used to determine the flow rate of coolant through the fuel element under test. In connection with the measurement employing the reference fuel element, it shall be understood that the reference fuel element has the same time constants and a cooling channel of the same geometry and coolant volume as the fuel element whose flow rate V is to be measured.

The whole circuit of FIG. 3 can also be realized by a small computer such as a type HP2100 manufactured by Hewlett Packard company. This would provide more flexibility and capacity to measure coolant flow rates of all the fuel elements of a reactor core simultaneously. Also the function of the "comparator" 29 can be performed by the computer, i.e. to adjust a fixed time delay $\tau_s$ of the simulated signal $\Delta T_s$ in such a way that the dislocation of the cross correlation function in comparison with the autocorrelations function disappears. In this case $\tau_s$ is equal to the coolant transit time being used to determine the coolant flow rate.

Figure 4:
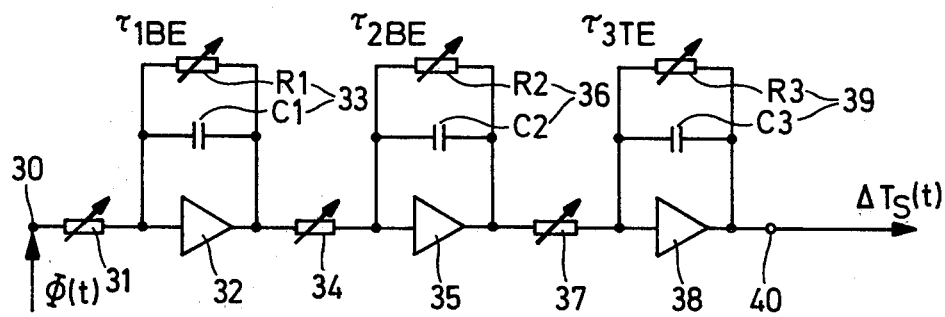
FIG. 4 is a circuit diagram of a fuel element simulator.

FIG. 4 shows the circuit diagram of the fuel element simulator 4 with which the power proportional neutron flux signal $\Phi$ is converted into an equivalent signal for simulating the simulated temperature rise $\Delta T_S$. The neutron flux signal $\Phi$ is measured by means of a neutron detector which may be disposed either inside or outside the reactor core. With an almost constant coolant inlet temperature $T_E$, the variation in the coolant outlet temperature $T_A$ of each fuel element caused by stochastic fluctuations of the reactor power (power noise) is measured, and from this variation (noise) in the coolant outlet temperature there is obtained for each fuel element the interrelationship between the neutron flux and the coolant temperature.

The interrelationship between reactor power noise and outlet temperature noise or more generally between reactor power and temperature rise of the coolant passing a fuel element is given by the transfer function $H(\omega)$ between the neutron flux $\phi(\omega)$ (input) and the temperature rise $\Delta T_A(\omega) = T_A(\omega) - T_E(\omega)$ (output) according to the equation $$\Delta T_A(\omega) = H(\omega) \cdot \phi(\omega)$$

The transfer function $H(\omega)$ can be determined by standard noise analysis techniques, for instance, i.e. measuring the auto- and crosspower spectral density functions of the corresponding signals and dividing the cross power spectrum by the autopower spectrum of the neutron signal (c.f. J. S. Bendat, Principles and Applications of Random Noise Theory; John Wiley and Sons, Inc., New York, 1958).

The theory for modeling fuel elements by low-pass filters is given in the publication: Simulation of Fuel Element Thermal Hydraulics for Sensitive Monitoring of Coolant Flow by M. Edelmann (in: Proc. IAEA/NP-PCI Specialists's Meeting on Procedures and Systems for Assisting an Operator during Normal and Annomalous Nuclear Power Plant Operation Situations, Munich, Dec. 5-7, 1979).

From the measured transfer function the fuel element and thermocouple time constants as well as the transit time of the coolant can be derived by fitting the theoretical transfer function to the measured one using conventional least-squares methods. Whereas the gain of the transfer function depends only on the time constants of fuel element and thermocouple, the phase angle of the (complex) transfer function is additionally depending on the delay time $\tau$ of the measured outlet temperature $T_A(\omega)$ with respect to the simulated signal $T_s(\omega)$. This delay in the measured signal is equivalent to an additional phase shhift $\phi_v(\omega) = -\omega\tau$ in the transfer function. Thus the slope of the linear part of the phase angle $(-\tau)$ which is predominant at higher frequencies gives the delay time needed to determine the coolant flow rate through a fuel element.

In a larger reactor core with a plurality of spatially dispersed neutron detectors, the detector which has the signal of the highest correlation with the outlet temperature signal of a fuel element to be simulated (i.e. the nearest one, in general) is used to simulate that particular fuel element outlet temperature.

Preferably, only the alternating current component of the signals is utilized. Under normal operation conditions the power noise is sufficient for the measurement, otherwise small changes in power are induced by moving the control rod.

The neutron flux signal $\Phi$ is fed to the input 30 of a first lowpass filter of the first order with which the thermal hydraulic performance of the fuel elements can be simulated to a good approximation. The first lowpass filter consists of a first adjustable input resistor 31 and a first operational amplifier 32 in whose feedback branch there is connected a first RC member 33 including a potentiometer $R_1$ and a capacitor $C_1$. Potentiometer $R_1$ is set to provide a first time constant $\tau_{1BE} = R_1 \cdot C_1$ corresponding to the time constant of the fuel element.

In certain applications it may be of advantage to connect after the first lowpass filter a basically identical second lowpass filter for setting a second time constant $\tau_{2BE} = R_2 \cdot C_2$, consisting of an adjustable second input resistor 34, a second operational amplifier 35, a potentiometer $R_2$ and a capacitor $C_2$. Potentiometer $R_2$ is set to a value which enables the first and second lowpass filters to more closely approximate the thermal hydraulic behaviour of the fuel element. This second low-pass filter is not needed, if its time constant $\tau_2 BE$ is much smaller than the first time constant $\tau_{1BE}$ of the fuel element or the time constant $\tau_3 TH$ of the thermocouple or if the power noise producing the outlet temperature noise is restricted to frequencies below the corner frequency $\omega_2 = 1/\tau_{2BE}$, of the second low-pass filter.

If the thermocouples employed cause the temperature signal to be band limited, a third lowpass filter can be connected thereto which includes a third settable input resistor 37, a third operational amplifier 38, a third potentiometer $R_3$ and a third capacitor $C_3$. The potentiometer $R_3$ is set to simulate the time constant $\tau_{3TE} = R_3 \cdot C_3$ which is caused by the thermocouple 52 with which the coolant outlet temperature $T_A$ is measured.

It will be understood that the above description of the present invention is susceptible to various modifications, changes and adaptations, and the same are intended to be comprehended within the meaning and range of equivalents of the appended claims.

I claim:

1. A method for determining the transit time $\tau$ of coolant traversing a cooling channel of a nuclear reactor fuel element from the effective center of said fuel element to a point where said coolant exits therefrom, comprising the steps of:
   continuously measuring the temperature $T_A$ of the coolant exiting said fuel element, said coolant outlet temperature being changed by fluctuations in reactor power, changes in the neutron flux and changes in the temperature of the coolant entering said fuel element;
   continuously measuring the temperature $T_E$ of said coolant before said coolant enters said fuel element;
   generating a measured temperature rise signal $\Delta T_A$ corresponding to the difference between said measured coolant outlet temperature and said coolant inlet temperature;
   continuously measuring the neutron flux $\Phi$ of the core of said nuclear reactor by means of at least one neutron detector to generate a neutron flux signal;
   converting said neutron flux signal to a simulation signal simulating a change (rise) $\Delta T_S$ in an undelayed simulated coolant outlet temperature $T_S$ due to heating of said coolant when traversing said fuel element;
   comparing said measured temperature rise signal $\Delta T_A$ with the rise $\Delta T_S$ in said undelayed simulated coolant outlet temperature $T_S$; and
   determining the time shift of said measured coolant outlet temperature $T_A$ with respect to the undelayed simulated coolant outlet temperature $T_S$, said time shift corresponding to said transit time $\tau$.

2. The method defined by claim 1 which further comprises the step of determining the flow rate V of coolant through said cooling channel from the relationship $$V = (V_o/\tau)$$

where $V_o$ is the volume of said cooling channel between the effective center and exit of said fuel element.

3. The method defined by claim 1 wherein said nuclear reactor includes a reference fuel element having the same time constants and a cooling channel of the same geometry and coolant volume as the fuel element whose transit time is to be measured, the transit time $\tau_{ref}$ and the flow rate $V_{ref}$ of said reference fuel element being known, said method comprising the further step of determining the flow rate V of coolant through said cooling channel from the relationship $$V = (V_{ref}\tau_{ref})/\tau.$$

4. The method defined by claim 1 which comprises the further step of correlating the change in said undelayed simulated coolant outlet temperature with itself to form an autocorrelation function AKF, the step of comparing said measured temperature rise signal with the change in said undelayed simulated coolant exit temperature to form a crosscorrelation function KKF, and the step of determining the time shift of said measured coolant outlet temperature with respect to the undelayed simulated coolant outlet temperature comprises comprising the time shift of said autocorrelation function with respect to said crosscorrelation function, said autocorrelation and crosscorrelation functions having maxima and said time shift measurements being made most effectively adjacent said maxima at the ascending and descending sections of said functions, said time shift corresponding to said transit time $\tau$.

5. The method defined by claim 1 which comprises the furthe step of synchronizing said simulation signal with said measured temperature rise signal, said synchronized signals having no time delay with respect to each other which is achieved by adjusting an artificial delay of the simulated signal which corresponds to the transit time $\tau$ of said coolant.

6. The method defined by claim 1 wherein the step of continuously measuring said coolant exit temperature $T_A$ is effected by a thermocouple, said fuel element and thermocouple have time constants $\tau_{BE}$ and $\tau_{TH}$ respectively, and said neutron flux signal measuring the neutron flux $\Phi$ and the thermocouple signal corresponding to the coolant exit temperature $T_A$ have a phase shift $\phi(\omega)$ therebetween, said phase shift $\phi(\omega)$ having a first component $$\phi(\omega)_{BE} = \arctan(-\omega\tau_{BE})$$

determined by said fuel element, a second component $$\phi(\omega)_V = -\omega\tau$$

determined by the transit time $\tau$ of said coolant and a third component $$\phi(\omega)_{TH} = \arctan(-\omega\tau_{TH})$$

determined by said thermocouple, wherein $\omega$ is the angular frequency of said signals, said method including the further steps of measuring the transfer function $H(\omega)$ of said coolant outlet temperature $T_A$ with respect to said neutron flux $\Phi$; and determining the time constants $\tau_{BE}$ and $\tau_{TH}$ of said fuel element and said thermocouple respectively; the transit time $\tau$ of said coolant for the components $\phi(\omega)_{BE}$, $\phi(\omega)_V$ and $\phi(\omega)_{TH}$ of the phase shift $\phi(\omega)$ being determined so as to minimize the quadratic deviation between the measured and theoretical phase characteristics of the phase shift $\phi(\omega)$.

7. The method defined by claim 1 which further comprises the step of measuring the transfer function between said measured coolant temperature rise $\Delta T_A$ and said simulated coolant temperature rise $\Delta T_S$, i.e. the ratio said transfer $\Delta T_A(\omega)/\Delta T_S(\omega)$ function having only a frequency proportional phase shift $\phi(\omega)_V = -\omega\tau$ determined by the transit time $\tau$ of said coolant, the negative slope of the phase of said measured transfer function corresponding to the transit time $\tau$ of said coolant.

8. Apparatus for determining the transit time $\tau$ of coolant traversing a cooling channel of a nuclear reactor fuel element from the effective center of said fuel element to a point where said coolant exits therefrom, said nuclear reactor including a reference fuel element, comprising a first comparator having a first input for receiving a signal $T_E(t)$ corresponding to the temperature of the coolant entering said fuel element and a second input for receiving a signal $T_A(t)$ corresponding to the measured temperature of the coolant exiting said fuel element, a signal $\Delta T_A(t)$ corresponding to the rise of the measured temperature of the coolant when traversing said fuel element being generated at the output of said first comparator;

a second comparator having a first input for receiving said signal $T_E(t)$ corresponding to said coolant inlet temperature and a second input for receiving a signal $T_{Aref}(t)$ corresponding to the measured temperature of the coolant exiting said reference fuel element, a signal $\Delta T_{Aref}(t)$ corresponding to the rise of the measured temperature of the coolant when traversing said reference fuel element being generated at the output of said second comparator;

a fuel element simulator having an input terminal for receiving a neutron flux signal $\Phi(t)$ proportional to the power P of said fuel element, a signal $\Delta T_S(t)$ corresponding to the rise in an undelayed simulated coolant outlet temperature $T_S$ being generated at the output of said fuel element simulator;

a first correlator having first and second inputs and an output, the first input of said first correlator being connected to the output of said first comparator;

a second correlator having first and second inputs and an output;

switching means having first and second positions for selectively coupling the second input of said first correlator and the first and second inputs of said second correlator to either the output of said second comparator or the output of said fuel element simulator, the output of said first correlator forming when said switch is in said first position a cross-correlation function KKF from the signals $\Delta T_A(t)$ and $\Delta T_S(t)$ and said second correlator forming when said switch is in said first position an autocorrelation function AKF from the signal $\Delta T_S(t)$, and the output of said first correlator forming when said switch is in said second position a crosscorrelation function KKF from the signals $\Delta T_A(t)$ and $\Delta T_{Aref}(t)$ and said second correlator forming when said switch is in said second position an autocorrelation function AKF from the change $\Delta T_{Aref}(t)$; and a third comparator having first and second inputs coupled to the outputs of said first and second correlators respectively, the output of said third comparator being proportional to the time shaft between the outputs of said first and second correlators and corresponding to said transit time $\tau$.

9. Apparatus as defined by claim 8 wherein said fuel element simulator comprises at least one series-connected lowpass filter of the first order, each of said lowpass filters including an operational amplifier having an input and an output;

an input resistor coupled to the input of said operational amplifier; and an RC circuit coupled between the output and input of said operational amplifier, the adjustable time constant of said RC circuit being determined by said fuel element.

10. Apparatus as defined by claim 9 which includes first and second lowpass filters, said first and second lowpass filters together forming a lowpass filter of the second order with two adjustable time constants determined either solely by the fuel element or one time constant determined by the fuel element and another one by the thermocouple.

11. Apparatus as defined by claim 9 or 10 which comprises a band limiting thermocouple for measuring the temperature of the coolant exiting said fuel element and a further lowpass filter coupled in series with said series-connected lowpass filters, said further lowpass filter including a further operational amplifier having an input and an output;

an input resistor coupling the input of said further operational amplifier to the output of the operational amplifier in the preceding lowpass filter; and an RC circuit coupled between the output and input of said operational amplifier, the adjustable time constant of said RC circuit being determined by said thermocouple.

12. Apparatus as defined by claim 11 wherein the input resistors in said lowpass filter and said further lowpass filter are adjustable.

13. Apparatus as defined by claim 8 wherein said fuel element simulator includes an amplifier only for normalizing the signal of the simulated coolant temperature with respect to the measured temperature.

* * * * *